UNITED STATES PATENT OFFICE.

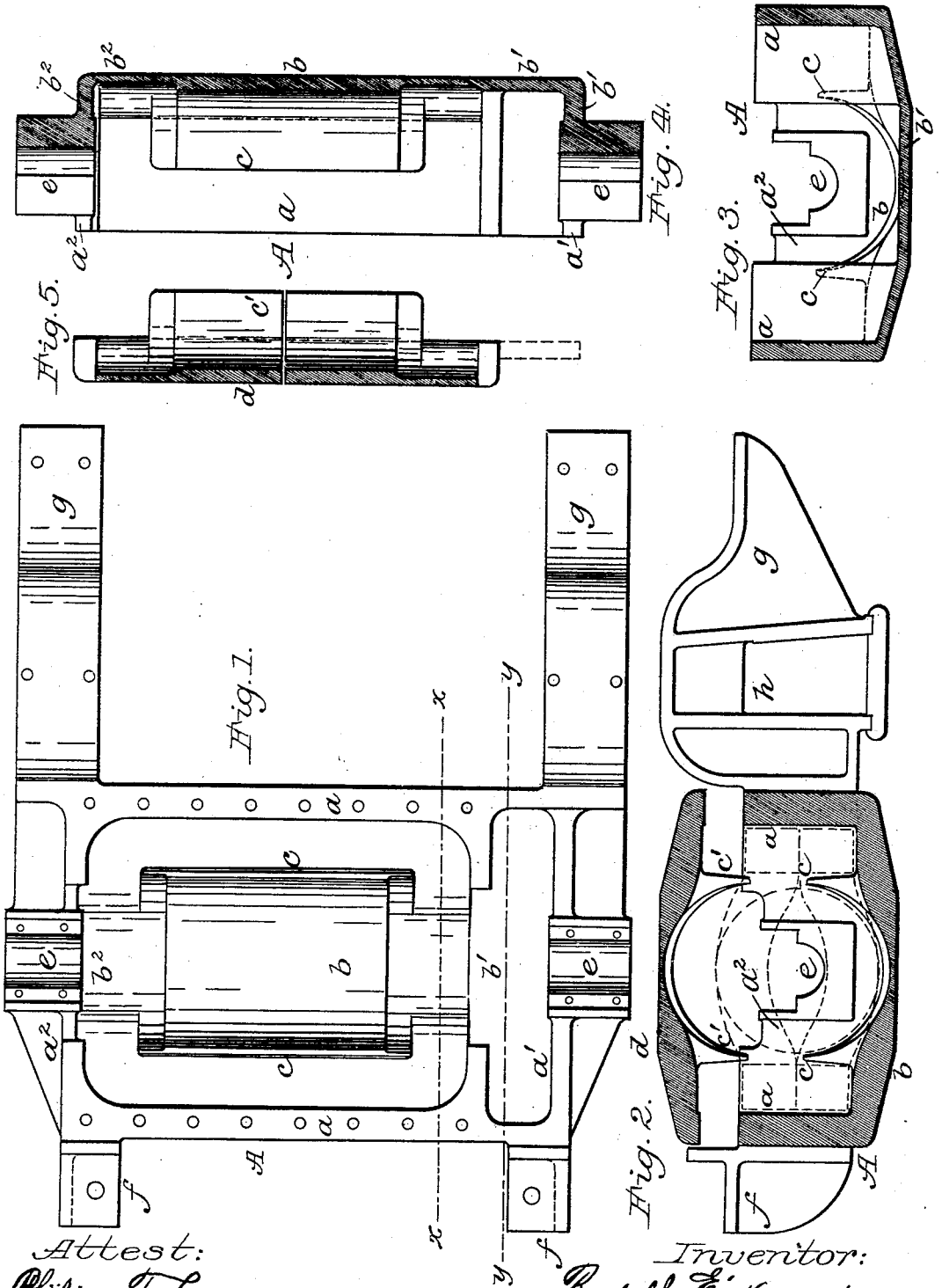

RUDOLF EICKEMEYER, OF YONKERS, NEW YORK.

ELECTRIC LOCOMOTIVE.

SPECIFICATION forming part of Letters Patent No. 520,228, dated May 22, 1894.

Application filed June 1, 1891. Serial No. 394,742. (No model.)

*To all whom it may concern:*

Be it known that I, RUDOLF EICKEMEYER, of Yonkers, in the county of Westchester and State of New York, have invented certain new and useful Improvements in Electric Locomotives; and I do hereby declare that the following specification, taken in connection with the drawings furnished and forming a part of the same, is a clear, true, and complete description of my invention.

My said improvements involve the use of dynamo electric machines of the type disclosed in Letters Patent No. 358,340, issued to me February 22, 1887, and still further, the use of certain improvements in electric locomotives, heretofore devised by me and disclosed in Letters Patent No. 453,167, issued to me May 26, 1891. In this last named patent, I showed and described electric locomotive organizations, in which the armature shaft was directly coupled to one, and also to two driving axles, by means of pitman connections, and a portion of the casing, or shell, of the motor, constituted an important part of the motor frame in each instance. In all of the forms shown therein, a portion of said casing constituted an integral portion of the motor frame proper, or, in other words, the armature supporting frame; and in some of them, the said portion of the casing is integral with the motor frame considered as a complete structure, including the frame arms, or extensions, which contain jaws or "pedestals" for the axle boxes, but in all of said forms heretofore disclosed by me, the tops and bottoms of the motor shell or casing, are separable, and are applied to the central, or frame portion by means of bolts.

I have now devised my motor casing or shell, so that its sides and bottom are integral and seamless, said bottom and the sides being cast in one piece, of suitable magnetic metal; and these portions are not only cast in one piece, but the sides are also integrally extended to provide appropriate frame ends and journal box seats for the armature shaft; and further, said ends are integrally and directly connected with the bottom of the casing; and, still further, the casing is also so formed, and cast, that the ends of said sides the bottom, and the journal box ends are not only integral, but they are also integral with rectangular extensions, or frame arms, which contain the jaws or pedestals, in which the car axle boxes are located, and when only one pair of such frame arms are used, brackets, integral with the casing, are provided, for securing the motor frame to the under side of the sill frame of a car. With such a motor casing, its immediate frame, and the frame arms or extensions, great strength is secured without undue weight of metal, as well as substantial economy in construction; and the only necessarily detachable parts, are the journal box caps, and the top of the casing or shell, the latter being in one or two parts, a division thereof being desirable for convenience in handling, as in assembling, or for the inspection or removal of the armature and the field coils; and in addition to these results, the interior of the motor is effectually guarded against the upward entrance of water, moisture, and dust from the road bed; the integrality of the sides and bottom of the casing, also secures a minimum of resistance in the lower magnetic circuit, while the integrality of the bottom of the casing with the portions of the frame which support the armature shaft, affords with comparatively little metal, a capacity to resist the heavy torsional strains which are incident to direct pitman connections.

To more particularly describe my invention, I will refer to the accompanying drawings, in which—

Figure 1, is a top or plan view of my improved motor casing and motor frame, the top of the casing and the journal box caps being removed, as for the introduction of the field coils and armature. Fig. 2, is a sectional view of the casing and frame, on line $x$, Fig. 1, the top of the casing being shown as if being dropped into its proper position. Fig. 3, is a similar sectional view on line $y$, Fig. 1, without the top of the casing. Fig. 4, is a sectional view of the casing, and frame, on a line with the centers of the armature journal box seats. Fig. 5, is a sectional view of the casing top, on a line corresponding with the section line of Fig. 4.

The motor casing A, considered independently of any portion of the framing, consists of the sides $a$, bottom $b$, with its cheek pieces $c$, and the top $d$, with its cheek pieces $c'$, and for the first time, the said sides, and bottom are integral, instead of being in separate pieces, and bolted together. This feature of construction, affords a cup like recess for the reception of the field coils and the armature, these being indicated in dotted lines in Fig. 2. The top $d$, is in one, or two, or more pieces, according to the size of the motor, for convenience in handling, as for inspection and repairs. The top is secured to the sides of the casing by means of bolts, the holes for which are shown in Fig. 1. As a rule, the cheeks $c$ and $c'$ are integral, respectively, with the bottom and top, and although they need not be separately constructed, and applied, this may be done, and it will only involve unnecessary cost, without defeating the main objects of my invention. The sides $a$, as clearly shown in Figs. 1 and 5, are extended at each end, and united across the ends, as at $a'$, and $a^2$, which extensions, afford seats $e, e$, for the boxes of the armature shaft, and the bottom $b$, is integrally extended in both directions, as at $b'$, and $b^2$, Fig. 5, so that it unites integrally, with both of the ends $a'$, and $a^2$, thus enlarging the cup like structure, and rendering the entire motor-casing, and the armature supporting frame, absolutely seamless at all points below the top edges of the sides of the casing. The space above the bottom extension $b'$, is occupied in part by the commutator hub, the brushes of the motor being mounted in the usual manner, or upon the journal box caps, as disclosed in my Letters Patent of May 26, 1891, and with brushes so mounted, said space may be partially closed in at its ends, by providing the cap $d$, at its ends, with extensions as indicated in dotted lines in Fig. 5.

With the motor casing, and frame, constructed as thus far described, the main objects of my present invention will be secured, and the same, as a complete structure, may be provided with separable brackets, as at $f, f$, and united to separable frame arm extensions as at $g, g$, as described in my said Letters Patent No. 453,167, but the best economic results will accrue, by providing the motor casing and its immediate frame, with integral brackets $f, f$, and frame arms or extensions $g, g$, as here shown, and it will be seen, on referring to Fig. 2, that when the top $d$, has been dropped into position between the upwardly projecting portions of said brackets and arms, it can be so snugly fitted, that its lateral displacement will be absolutely impossible, and therefore only a minimum number of bolts, and bolt fittings will be required, these being needed in a top, which is in one piece, merely for obviating vertical displacement.

The frame arms $g, g$, are each provided with integral axle box jaws $h$, as in my aforesaid prior patent, and although I have here shown one pair of brackets, and one pair of frame arms, it is to be understood, that the motor casing and its immediate frame, are sometimes provided wholly with brackets $f$, and sometimes with two pairs of frame arms, and that the main objects of my invention will be secured, whether these brackets or the arms are integral with each other, and with the casing, or separable, and bolted to said casing, so long as its immediate frame is constructed as herein described.

It is obvious, that in an organization wherein both ends of an armature shaft are coupled by direct pitman connections with one or two driving axles, the motor frame, in the line of the motor shaft, is subjected to heavy complex strains, of a torsional nature, especially during the stopping and starting of the locomotive, and the reinforcement of the ends $a'$, $a^2$, by the bottom extensions $b'$, and $b^2$, is a valuable factor in that connection, independently of the value of said extensions in the way of protecting the motor from the entrance of extraneous matter. It will also be seen, that, the bottom of the casing being extended as described, into union with the armature supporting frame, and in turn connected with the frame arm extensions, the said extended portions of the bottom, materially and effectually reinforce the armature supporting frame, and enable it to resist injury from such heavy shocks as must inevitably be borne, whenever either, or both of the wheels on a driven axle, while under speed, should strike such obstructions, as are liable to be encountered on the rails.

Having thus described my invention, I claim as new and desire to secure by Letters Patent—

1. In an electric locomotive, a motor casing or shell, of magnetic metal for the reception of an armature, and field coils, having its sides and bottom integral and seamless, and provided with a detachable top, affording access to the field coils and armature, said bottom and sides constituting a cup like structure, and excluding water, moisture and dust from entering upwardly into the motor, substantially as described.

2. In an electric locomotive, a motor casing or shell of magnetic metal, for the reception of an armature and field coils, having its sides integrally extended and connected, and affording box seats for the armature shaft, and a bottom which is integral with said sides, and is extended into integral connection with said ends, the said sides, bottom, and ends, constituting not only a seamless cup like structure, but also an armature frame, which is strengthened and braced by its union with the bottom of the shell or casing, substantially as described.

3. In an electric locomotive, a motor casing or shell of magnetic metal for the reception of an armature and field coils, having its sides, bottom and armature frame integral and seamless, and also having integral rectangular extensions or arms, containing jaws for the reception of car axle boxes, substantially as described.

RUDOLF EICKEMEYER.

Witnesses:
NORTON A. OTIS,
JAMES IRVINE.